United States Patent
Yamasaki et al.

(10) Patent No.: US 10,244,456 B2
(45) Date of Patent: Mar. 26, 2019

(54) WIRELESS COMMUNICATION SYSTEM, CONTROL SERVER, AND BASE-STATION SWITCHING OPERATION CONTROL METHOD

(71) Applicant: HITACHI CONSTRUCTION MACHINERY CO., LTD., Tokyo (JP)

(72) Inventors: Ryota Yamasaki, Tokyo (JP); Tomoyuki Hamada, Tsuchiura (JP); Akiyoshi Kirimura, Tsuchiura (JP); Tsutomu Yamada, Tokyo (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 15/578,774

(22) PCT Filed: Jun. 2, 2016

(86) PCT No.: PCT/JP2016/066471
§ 371 (c)(1),
(2) Date: Dec. 1, 2017

(87) PCT Pub. No.: WO2016/195040
PCT Pub. Date: Dec. 8, 2016

(65) Prior Publication Data
US 2018/0302835 A1 Oct. 18, 2018

(30) Foreign Application Priority Data

Jun. 3, 2015 (JP) ................................. 2015-113182

(51) Int. Cl.
*H04W 4/02* (2018.01)
*H04W 36/32* (2009.01)
(Continued)

(52) U.S. Cl.
CPC .......... *H04W 36/32* (2013.01); *G05D 1/0214* (2013.01); *G05D 1/0297* (2013.01);
(Continued)

(58) Field of Classification Search
CPC ..... H04W 36/32; H04W 16/18; H04W 36/16; H04W 36/08; H04W 4/02; H04W 88/08;
(Continued)

(56) References Cited

U.S. PATENT DOCUMENTS

| | | | |
|---|---|---|---|
| 2005/0048976 A1 | 3/2005 | Kalhan et al. | |
| 2008/0137589 A1* | 6/2008 | Barrett | H04M 3/42348 370/327 |
| 2013/0268138 A1* | 10/2013 | Moughler | G05D 1/0214 701/2 |

FOREIGN PATENT DOCUMENTS

| | | |
|---|---|---|
| JP | 2003-009207 A | 1/2003 |
| JP | 2003-231467 A | 8/2003 |

(Continued)

OTHER PUBLICATIONS

Yu Zheng, "Mining Interesting Locations and Travel Sequences from GPS Trajectories", Microsoft Research Asia, No. 49, Year 2009.*

(Continued)

*Primary Examiner* — Lan-Huong Truong
(74) *Attorney, Agent, or Firm* — Mattingly & Malur, PC

(57) ABSTRACT

A wireless communication system includes an on-board terminal equipment mounted on a working machine, and a control server communicably connected together via a network including a first wireless base station and a second wireless base station. The control server sets a zone of a travel route as a travel-permitted zone, for which a travel permission has been given only to the working machine. A permission requesting zone in the travel-permitted zone, in (Continued)

which the working machine makes a setting request to the control server for a new travel-permitted zone, is set as a no-handover zone in which switching of the connected base station from the first wireless base station to the second wireless base station is prohibited. The on-board terminal equipment switches the first wireless base station to the second wireless base in a zone other than the no-handover zone in the travel-permitted zone.

9 Claims, 13 Drawing Sheets

(51) Int. Cl.
*G05D 1/02* (2006.01)
*H04W 16/18* (2009.01)
*H04W 36/08* (2009.01)
*H04W 36/16* (2009.01)
*H04W 88/08* (2009.01)

(52) U.S. Cl.
CPC ............ *H04W 4/02* (2013.01); *H04W 16/18* (2013.01); *H04W 36/08* (2013.01); *H04W 36/16* (2013.01); *G05D 2201/0202* (2013.01); *H04W 88/08* (2013.01)

(58) Field of Classification Search
CPC ... G05D 1/0297; G05D 1/0291; G05D 1/0287
See application file for complete search history.

(56) References Cited

FOREIGN PATENT DOCUMENTS

| | | |
|---|---|---|
| JP | 2003-284115 A | 10/2003 |
| JP | 2007-503768 A | 2/2007 |
| JP | 2009-199314 A | 9/2009 |
| WO | 2015/037084 A1 | 3/2015 |

OTHER PUBLICATIONS

International Search Report of PCT/JP2016/066471 dated Jul. 19, 2016.

* cited by examiner

FIG. 4A

| Measuring coordinates | AP1 Quality | AP2 Quality | AP3 Quality | ... | APm Quality |
|---|---|---|---|---|---|
| ... | ... | ... | ... | ... | ... |
| $x_{n-1}, y_{n-1}$ | Q1n-1 | Q2n-1 | Q3n-1 | ... | Qm n-1 |
| $x_n, y_n$ | Q1n | Q2n | Q3n | ... | Qm n |
| $x_{n+1}, y_{n+1}$ | Q1n+1 | Q2n+1 | Q3n+1 | ... | Qm n+1 |
| ... | ... | ... | ... | ... | ... |

FIG. 4B

| AP identification information | AP area definition information |
|---|---|
| AP1 | $(x_{1-1}, y_{1-1}), (x_{1-2}, y_{1-2}), \ldots$ |
| AP2 | $(x_{2-1}, y_{2-1}), (x_{2-2}, y_{2-2}), \ldots$ |
| ... | ... |

FIG. 4C

| No-handover zone definition information |
|---|
| $(x_{P1}, y_{P1}), (x_{P2}, y_{P2}), \ldots$ |
| $(x_{Q1}, y_{Q1}), (x_{Q2}, y_{Q2}), \ldots$ |
| ... |

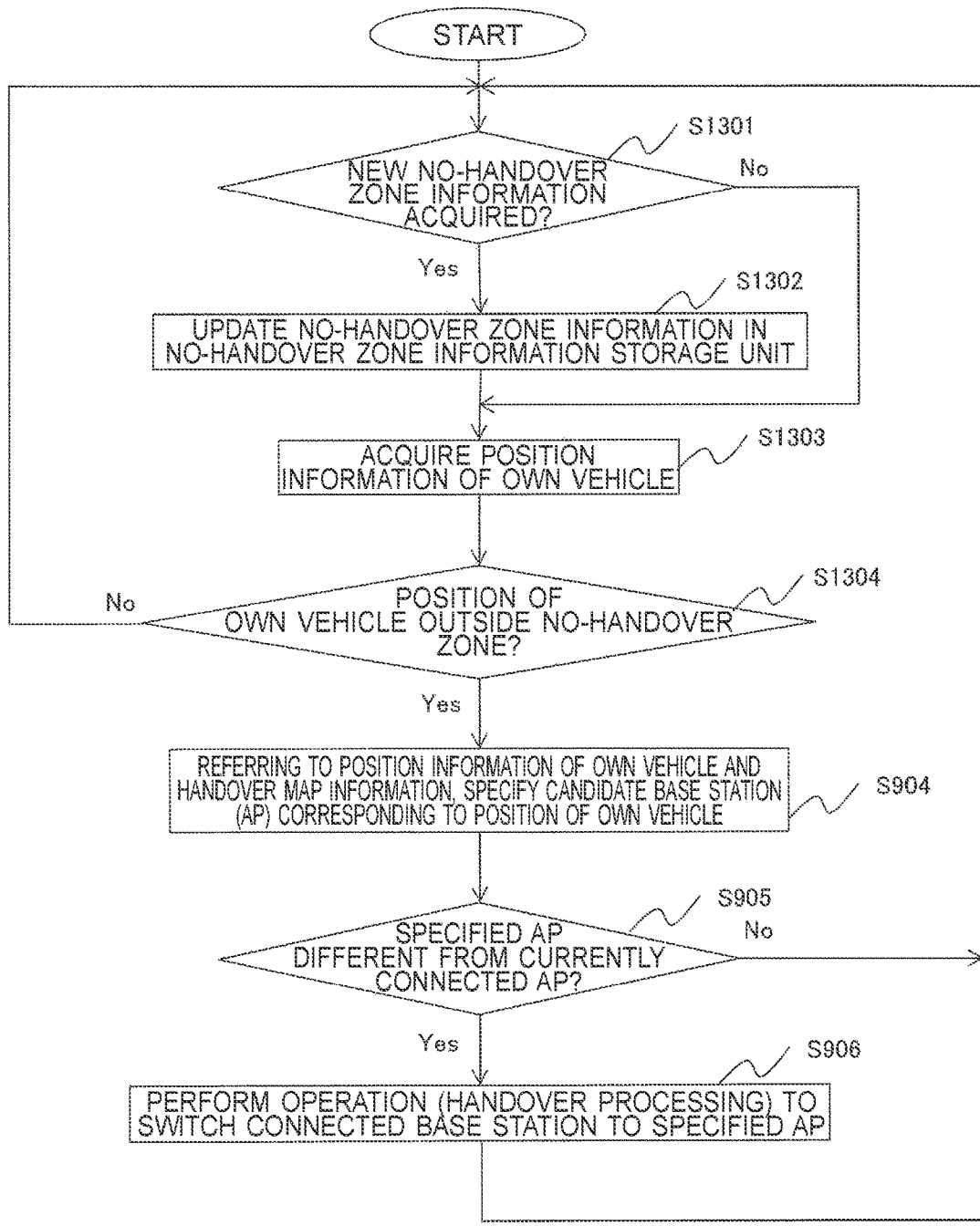

WIRELESS COMMUNICATION SYSTEM, CONTROL SERVER, AND BASE-STATION SWITCHING OPERATION CONTROL METHOD

TECHNICAL FIELD

This invention relates to a wireless communication system, a control server, and a base-station switching operation control method, and especially to base-station switching operation in a wireless communication system that connects a working machine in a mine and a control server together for wireless communications.

BACKGROUND ART

As documents describing handover techniques, there are Patent Document 1 and Patent Document 2.

Patent Document 1 discloses: "a mobile communication system comprises a plurality of base stations, a plurality of wireless zones covered by the base stations, and mobile stations movable in the wireless zones, and uses one of a plurality of channels to transceive voice and data between one of the base stations and one of the mobile stations, the wireless zones continue from one to the next to form an extended wireless zone, the first base station BS11 of the base stations BS11 to BS51 notifies frequency information item(s) f11 to f51 and position information item(s) of the remaining one or more base stations, and the mobile station has a GPS receiver, and includes means for receiving the frequency information and the position information of the one or more base stations notified from the first base station BS11, detecting switching locations of wireless zones based on the data of the GPS receiver and the received position information, and triggered by the detection, switching the frequency to the frequency of the succeeding base station BS12." (extracted from the Abstract)

Patent Document 2 discloses, as an example of dedicated short range communications (DSRC) technique in highway traffic communication systems: "in a travelling support system including a plurality of wireless base station equipment, which are arranged on the side of a road, and on-board wireless communication equipment, the wireless base station equipment transmits an inquiry about a traveling state of a vehicle located within a predetermined range of a road to the on-board wireless communication equipment, and responsive to the inquiry, the on-board wireless communication equipment transmits a response including vehicle identification information and traveling state information indicating the traveling state of the vehicle to the wireless base station equipment. Upon receipt of the response, the wireless base station equipment extracts the vehicle identification information and the traveling state information from the response, stores them in a storage device, analyzes the traveling state information stored in association with the vehicle identification information in the storage device, determines the traveling state of the vehicle, and to the on-board wireless communication equipment, transmits necessary information according to the traveling state." (extracted from the Abstract)

PRIOR ART DOCUMENTS

Patent Documents

Patent Document 1: JP 2003-284115 A
Patent Document 2: JP 2009-199314 A

DISCLOSURE OF THE INVENTION

Problem to be Solved by the Invention

In a mine, there is a system that uses wireless communications for operation management and autonomous travel control of dump trucks and remote control of excavators. In such a system, the stable availability of wireless communications is a condition required for improvements in the operation rate of the system. In a mine management system, various methods are known as techniques for the stabilization of wireless communications. As one of these methods, there is a method for stabilizing switching processing (handover) of wireless base stations.

Patent Document 1 sets handover locations based on data of a GPS receiver. However, a mine includes places, to which GPS radio waves can be hardly transmitted due to terrain conditions, such as areas below cliffs and areas behind mountains. At a location where GPS radio waves cannot be received, a handover location cannot be specified, the environment for wireless communications becomes unstable, leading to a potential problem that the operation of a working machine may be interrupted.

At a loading site or dumping site in a mine, a travel route is generated as needed corresponding to the position of a loading machine or dumping point. The use of the DSRC method of Patent Document 2 that arranges a plurality of wireless base station equipment on the side of a road in advance, therefore, may not fully follow changes of the travel route. As is appreciated from the foregoing, any attempt to apply the technique of Patent Document 1 or 2 to a wireless communication system in a mine leads to a circumstance that the technique cannot fully meet the environment specific to the mine.

With the foregoing circumstance in view, the present invention has as an object thereof the provision of a wireless communication technique that allows a working machine to operate more stably in a mine.

Means for Solving the Problem

To achieve the above-described object, the present invention is characterized in that in a wireless communication system including an on-board terminal equipment mounted on a working machine, which travels along a predetermined travel route in a mine, and a control server, which manages operation of the working machine, communicably connectable together via a network including a first wireless base station and a second wireless base station, the control server comprises a travel-permitted region setting unit that for the working machine, sets a region in the travel route, for which a travel permission has been given only to the working machine, as a travel-permitted region and generates permission response information including position information of the travel-permitted region, a no-handover zone setting unit that sets a travel permission requesting zone in the travel-permitted region, in which zone, the working machine makes a setting request to the control server for setting a new travel-permitted zone as a no-handover zone in which switching of a connected base station from the first wireless base station to the second wireless base station is prohibited, a switching operation control unit that generates switching operation control information for allowing the working machine to perform switching of the connected base station outside the no-handover zone, and a server-side communication control unit that transmits the switching operation control information to the working machine; and the on-board terminal equipment comprises a terminal-side communication control unit that receives the switching operation control information, and based on the switching operation control information, switches the connected wireless base station in a zone other than the no-handover zone in the travel-permitted region, and transmits, to the control server, permission request information for making a setting request for the new travel-permitted region.

Advantageous Effects of the Invention

According to the present invention, it is possible to provide a wireless communication technique that allows working machines to operate more stably in a mine. Problems, configurations and advantageous effects other than those described above will become apparent from the following description of embodiments.

BRIEF DESCRIPTION OF THE DRAWINGS

FIGS. 3A and 3B are functional block diagrams illustrating principal functions of the control server and on-board terminal equipment in the first embodiment, in which FIG. 3A illustrates the configuration of the control server, and FIG. 3B illustrates the configuration of the on-board terminal equipment.

FIGS. 4A to 4C are tables showing the configurations of communication quality information, handover map information, and no-handover zone information, in which FIG. 4A shows a table configuration example of the communication quality information, FIG. 4B shows a table configuration example of the handover map information, and FIG. 4C shows a table configuration example of the no-handover zone information.

FIGS. 5A to 5C are diagrams illustrating operation of a dump truck traveling according to travel-permitted regions, in which FIG. 5A illustrates a state of the dump truck traveling in a travel-permitted region n, FIG. 5B illustrates a state that the dump truck has reached a permission requesting point, and FIG. 5C illustrates the state of setting of a new travel-permitted region.

FIGS. 10A and 10B are functional block diagrams illustrating principal functions of a control server and an on-board terminal equipment in a second embodiment, in which FIG. 10A illustrates the configuration of the control server, and FIG. 10B illustrates the configuration of the on-board terminal equipment.

FIG. 13 is a flow chart illustrating a flow of processing at the on-board terminal equipment in the third embodiment.

MODES FOR CARRYING OUT THE INVENTION

Embodiments of the present invention will hereinafter be described in detail based on the drawings. Throughout the drawings for describing the embodiments, members having the same function are identified by the same designation or a relevant designation, and their repeated description will be omitted. It is also to be noted that in the following embodiments, the description of the same or similar parts will not be repeated as a general rule unless specifically needed.

First Embodiment

[System Configuration]

The first embodiment relates to a wireless communication system including an on-board terminal equipment mounted on a working machine, which travels along a predetermined travel route in a mine, such as an excavator, a wheel loader or a sprinkler truck, and a control server, which manages operation of the working machine, communicably connectable together via a wireless communication network, in which the wireless communication system generates handover map information to be referred to upon determination of a candidate base station when the on-board terminal equipment is connected to the wireless communication network. The first embodiment is characterized specifically in that the handover map representing the candidate wireless base station is configured to avoid overlapping of a boundary between communication areas with a no-handover region in which switching operation of the connected base station is prohibited.

A description will hereinafter be made taking, as the working machine that travels along the travel route, an autonomously traveling haulage vehicle (hereinafter called "dump truck") that autonomously travels without driving operation by an operator. The working machine may, however, be a manned working machine that travels according to driving operation by an operator.

Figure 1:
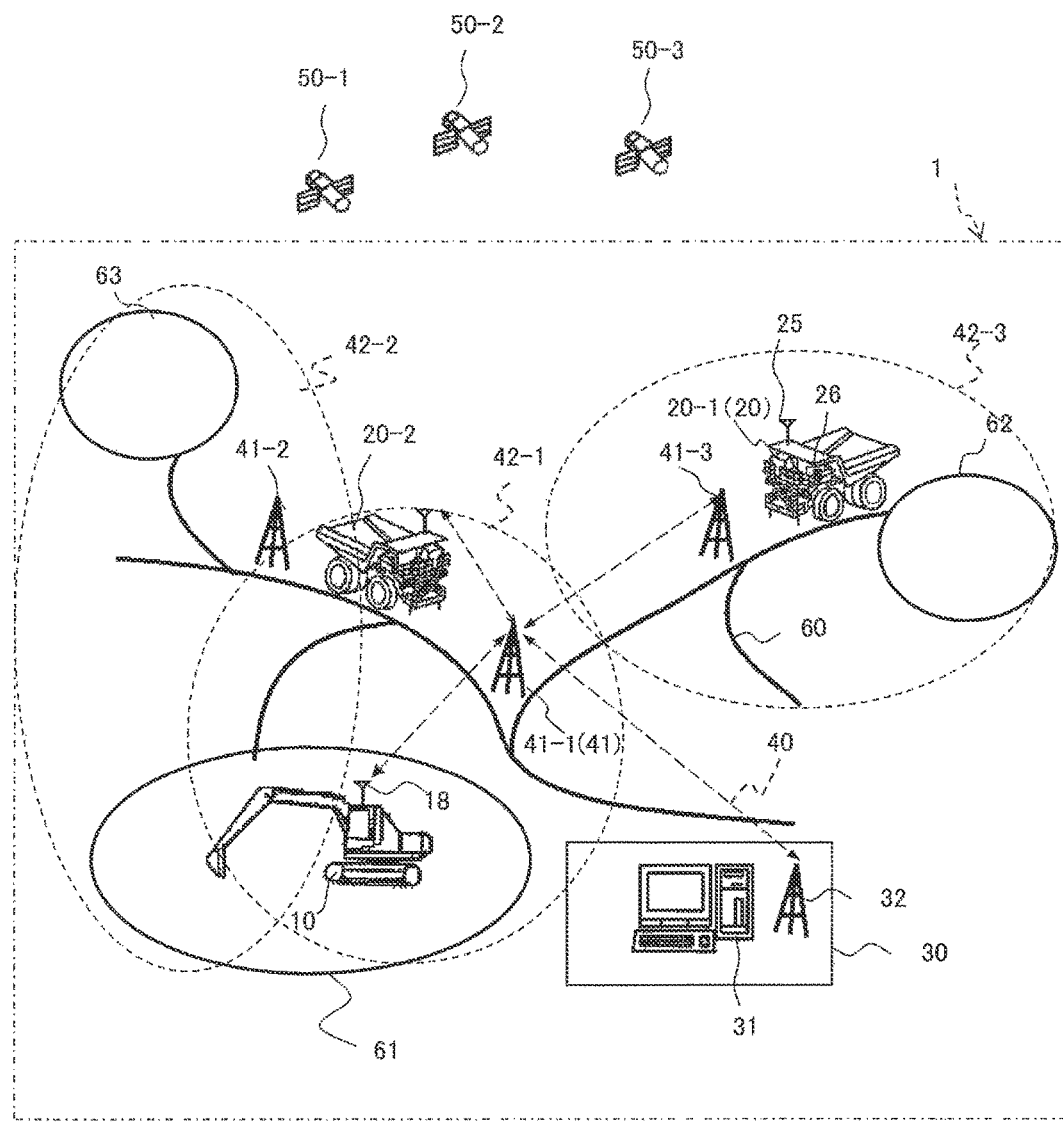
FIG. 1 is a view illustrating the schematic configuration of a wireless communication system according to a first embodiment.

Based on FIG. 1, the schematic configuration of the wireless communication system according to the first embodiment will be described first. FIG. 1 is a view illustrating the schematic configuration of the wireless communication system according to the first embodiment. The wireless communication system designated at reference sign 1 in FIG. 1 includes a super jumbo hydraulic excavator (hereinafter simply referred to as "excavator") 10 as a loading machine that performs digging work and loading work of rock and ore in a quarry such as a mine, dump trucks 20-1,20-2 that haul payloads such as rock, ore and/or the like, and a control server 31 installed at a control center 30 located near or remote from the quarry. As the dump trucks 20-1,20-2 have the same configuration, the dump trucks 20-1,20-2 will hereinafter be referred to as "the dump trucks 20" when they are collectively called without distinction.

Arranged in the mine are a loading site 61 where the excavator 10 performs digging work and the excavator 10 performs loading work to the dump trucks 20, a dumping site 62 where the dump trucks 20 dump rock or ore, another dumping site 63 where a crusher (not shown) is installed and the dump trucks 20 dump ore or the like, and a haul route 60 that connects the loading site 61 and each of the dumping sites 62,63 together.

Each dump truck 20 hauls payloads by traveling back and forth, between the loading site 61 and the dumping sites 62,63, along haul routes determined beforehand on the haul road 60.

The excavator 10, dump trucks 20 and control server 31 are connected together for wireless communications via a wireless communication network 40. To smoothly perform these connections for wireless communications, a plurality of wireless base stations 41-1,41-2,41-3 are arranged in the mine. Via these wireless base stations, radio waves of wireless communications are transmitted and received. Radio waves attenuate as the 41-1,41-2,41-3 increase. Reference signs 42-1,42-2,42-3 in FIG. 1 indicate ranges, in which the individual wireless base stations 41-1,41-2,41-3 and each dump truck 20 can perform transmission and reception of radio waves. Preferably, the individual wireless base stations 41-1,41-2,41-3 are arranged so that the ranges (hereinafter called "communication areas") 42-1,42-2,42-3, in which radio waves can be transmitted, overlap one to the next, whereby a connection to the wireless communication network 40 is feasible from any point insofar as the point is located on the travel route 64. The ranges in which radio waves can be transmitted are illustrated by round shapes in FIG. 1. Actually, however, these ranges may not have round shapes under the influence of the terrain. As the wireless base stations 41-1,41-2,41-3 have the same configuration, the wireless base stations 41-1,41-2,41-3 will hereinafter be referred to as "the wireless base stations 41" when they are collectively called without distinction. In the following description, within the ranges in which radio waves can be transmitted, areas designated for the individual connected/candidate wireless base stations in a handover map will be called "communication areas", and reference signs 42-1,42-2,42-3 will also be used commonly for the communication areas.

The excavator 10 and dump trucks 20 each carry a position calculating device 269 (see FIG. 2), for example, a global positioning system (GPS) for acquiring the position of the own vehicle by receiving positioning radio waves from at least three navigation satellites 50-1,50-2,50-3.

The excavator 10 includes an antenna 18 disposed at a location of good visibility, for example, on a top part of a cab for connection with the wireless communication network 40.

The dump trucks 20 each include an antenna 25 disposed at a location of good visibility, for example, on a front part of its top wall for connection with the wireless communication network 40. Further, the dump trucks 20 are each provided with an on-board terminal equipment 26 that communicates with the control server 31 via the wireless communication network 40 to perform autonomous travel control of the dump truck 20.

The control server 31 is connected with an antenna 32 via a wired communication network 33 (see FIG. 2), is connectable with the wireless base stations 41-1,41-2,41-3 via the wireless communication network 40, and communicates with the excavator 10 and each of the dump trucks 20.

Figure 2:
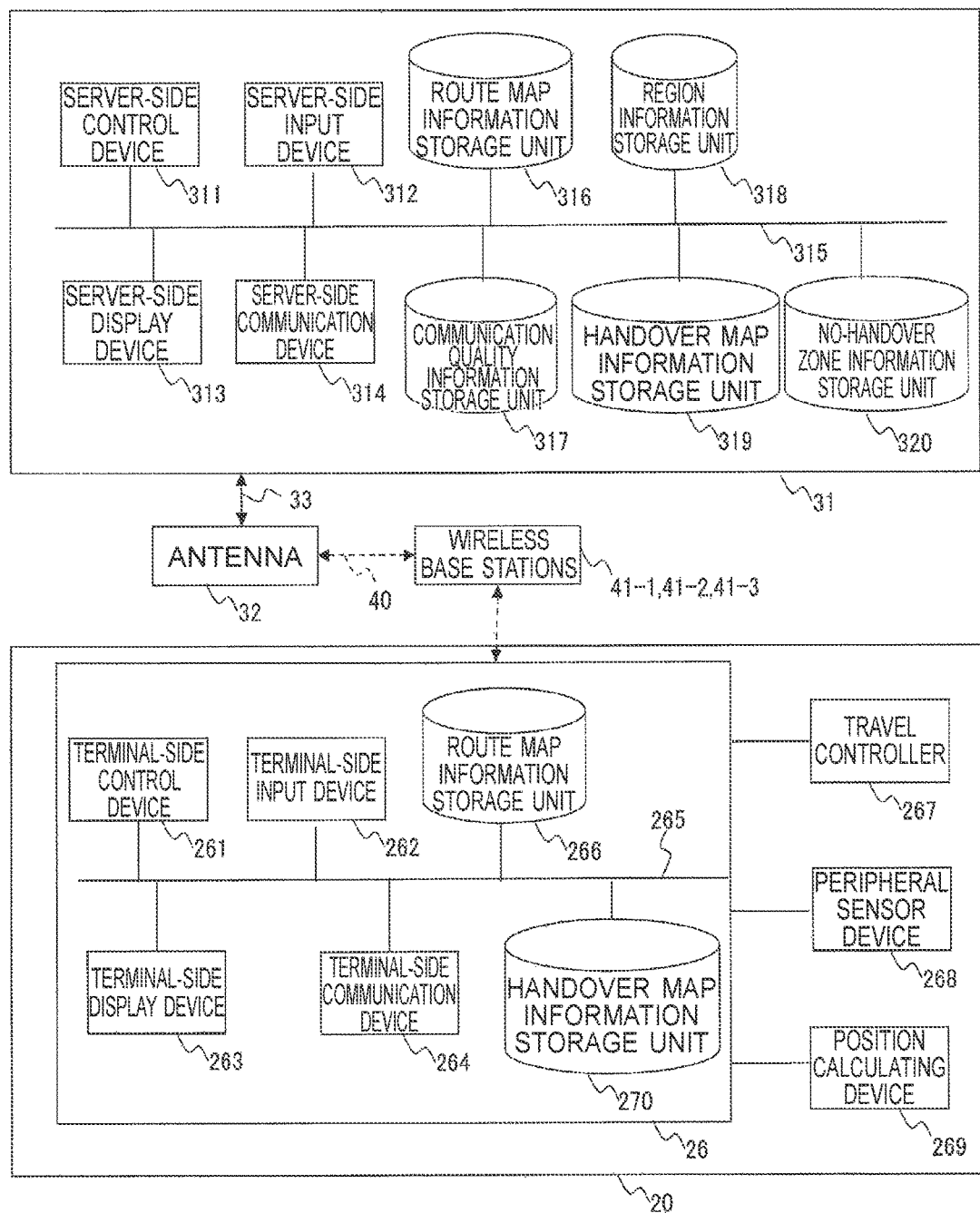
FIG. 2 is hardware configuration diagram of a control server and an on-board terminal equipment.

Referring next to FIG. 2, a description will be made about the hardware configurations of the control server 31 and on-board terminal equipment 26 in FIG. 1.

As illustrated in FIG. 2, the control server 31 is configured including a server-side control device 311, a server-side input device 312, a server-side display device 313, a server-side communication device 314, a communication bus 315, a route map information storage unit 316, a communication quality information storage unit 317, a region information storage unit 318, a handover map information storage unit 319, and a no-handover region information storage unit 320.

The server-side control device 311 controls operation of the individual elements of the control server 31, and is configured including hardware, which in turn includes a computing and control unit such as a central processing unit (CPU) and storage units such as a read only memory (ROM), a random access memory (RAM) and a hard disk drive (HDD), and software to be executed by the server-side control device 311. These hardware executes software such as a handover map information generating program according to the present invention and an autonomous travel program for executing autonomous travel control of the dump trucks 20, whereby the individual functions of the control server 31 are implemented.

The server-side input device 312 is configured of input devices such as a mouse and a keyboard, and functions as an interface that accepts input operation from an operator.

The server-side display device 313 is configured of a liquid crystal monitor or the like, and functions as an interface that displays and provides information to the operator.

The server-side communication device 314 is a wireless communication device.

The communication bus 315 electrically connects the individual elements together.

The route map information storage unit 316 is configured using a storage unit capable of fixedly storing map information, for example, a HDD. The map information is defined by individual points (hereinafter called "nodes") on the travel route, and links connecting the adjacent nodes each other. The map information may also include terrain information of the mine, and absolute coordinates (three-dimensional real coordinates calculated based on positioning radio waves) of the individual nodes. To the individual nodes and individual links, identification information (hereinafter called "node IDs" and "link IDs") is given to specifically identify them.

The communication quality information storage unit 317 stores data communication quality information (hereinafter simply referred to as "communication quality information") at desired points in the mine. The communication quality information may be configured by accumulating those transmitted from the individual dump trucks to the control server 31, or may be communication index values (for example, radio wave intensities), which represent data communication qualities of wireless communications, collected by a mobile survey vehicle while traveling on the travel route and then stored.

The region information storage unit 318 stores region information that includes position information of travel-permitted regions set for the individual dump trucks 20.

The handover map information storage unit 319 stores handover map information that includes information of base stations, with which on-board terminal equipment should be connected, at desired position coordinates in the area of the mine.

The no-handover region information storage unit 320 stores no-handover region information that defines areas, in each of which a handover is prohibited, in the area of the mine.

The on-board terminal equipment 26 mounted on each dump truck 20 is provided with a terminal-side control device 261, a terminal-side input device 262, a terminal-side display device 263, a terminal-side communication device 264, a communication bus 265, a route map information storage unit 266, and a handover map information storage unit 270. The on-board terminal equipment 26 is connected to each of a travel controller 267 mounted on the dump truck 20, a peripheral sensor device 268, and a position calculating device 269.

The travel controller 267 is a control system, which transmits an acceleration or deceleration amount, a braking amount and a steering angle to travel drive devices relating to traveling of the dump truck 20, such as an accelerator device, a brake device and a steering device of the dump truck 20.

The peripheral sensor device 268 is a sensor for detecting an obstacle in front of the dump truck 20 and surrounding environments, such as a millimeter-wave radar sensor or a front camera, and no limitation is imposed on its kind. A result of detection of the obstacle is outputted to the travel controller 267, and if necessary, is used for braking operation.

The terminal-side control device 261, terminal-side input device 262, terminal-side display device 263, terminal-side communication device 264, communication bus 265, route map information storage unit 266, and handover map information storage unit 270 are of the same configurations and perform the same functions as the server-side control device 311, server-side input device 312, server-side display device 313, server-side communication device 314, and communication bus 315, respectively. The route map information storage unit 316 of the control server 31 and the route map information storage unit 266 of the on-board terminal equipment 26 store the same route map information. The handover map information storage unit 270 stores the same information as the handover map information storage unit 319 included in the control server 31.

Figure 3A:
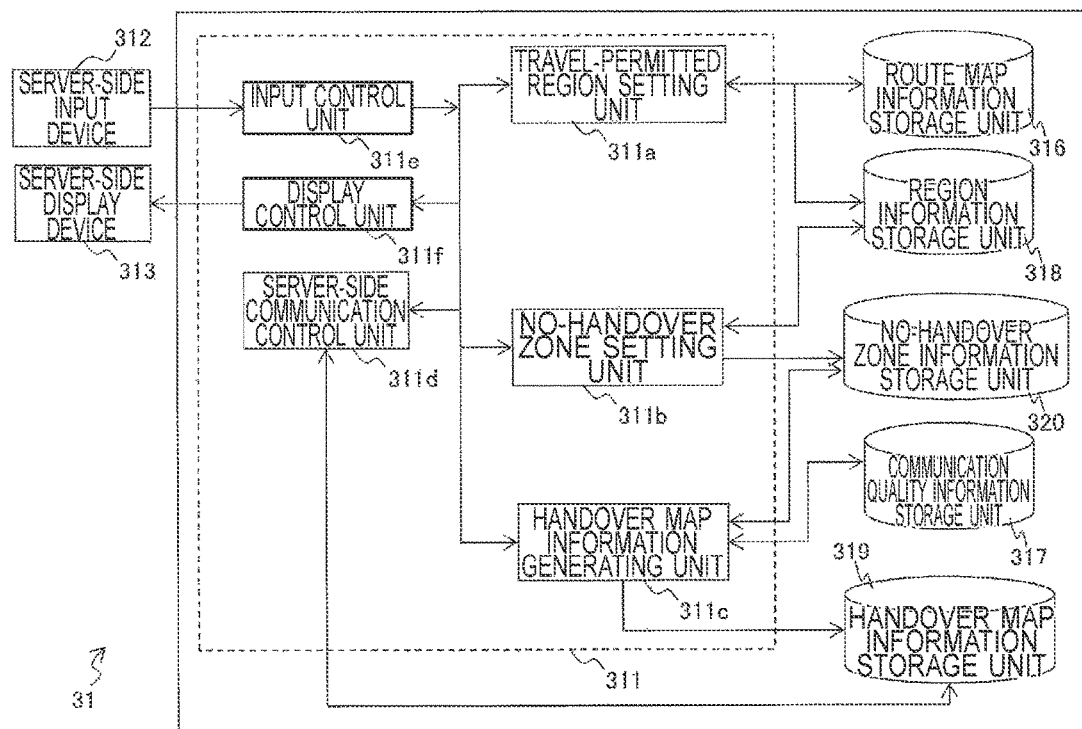
Figure 3B:
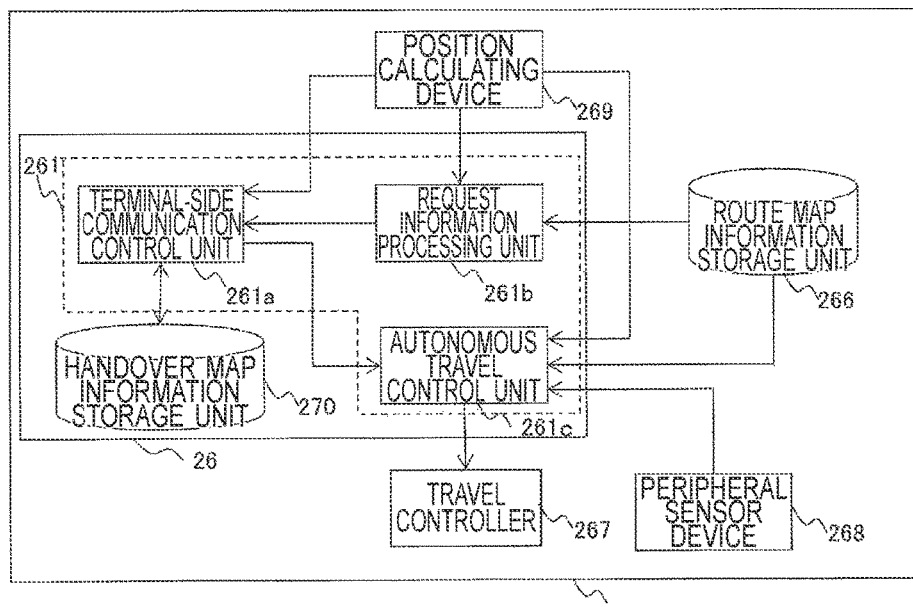

Referring next to FIGS. 3A and 3B, a description will be made about the functional configurations of the control server 31 and on-board terminal equipment 26 of FIG. 1. FIGS. 3A and 3B are functional block diagrams illustrating principal functions of the control server and on-board terminal equipment in the first embodiment, in which FIG. 3A illustrates the configuration of the control server, and FIG. 3B illustrates the configuration of the on-board terminal equipment.

As illustrated in FIG. 3A, the server-side control device 311 of the control server 31 is provided with a travel-permitted region setting unit 311a, a no-handover zone setting unit 311b, a handover map information generating unit 311c, a server-side communication control unit 311d, an input control unit 311e, and a display control unit 311f.

With reference to the map information in the route map information storage unit 316 and the region information storage unit 318, the travel-permitted region setting unit 311a sets, for each dump truck 20, a region in the travel route, for which a travel permission has been given only to the working machine, as a travel-permitted region, and generates permission response information including position information of the travel-permitted region. The travel-permitted region setting unit 311a sets a front boundary point at a point forward of the current position of the dump truck 20 on the travel route 64, and sets a rear boundary point at a point rearward of the front boundary point. Further, a region in the travel route 64, which is located between the front boundary point and the rear boundary point, is set as a travel-permitted region for the dump truck 20 which transmitted setting request information for a new travel-permitted region.

A point nearer by a permission request distance, which has been determined in view of a stoppable distance of the dump truck 20, from the front boundary point is called a "permission requesting point", and the zone between the front boundary point and the permission requesting point is called a "permission requesting zone". Further, a braking start point is set in the permission requesting zone at a point nearer than the front boundary point as a reference and apart by the distance in which the dump truck 20 can stop without traveling beyond the front boundary point.

With reference to the region information stored in the region information storage unit 318, the no-handover region setting unit 311b sets the permission requesting zone out of the travel-permitted region as a no-handover zone in which switching operation of the connected wireless base station is prohibited, and stores the no-handover zone in the no-handover zone information storage unit 320. The no-handover zone setting unit 311b also sets the inside of the loading site 61 and the insides of the dumping sites 62,63 as no-handover zones. These no handover zones are defined as closed zones in the mine.

With reference to the communication quality information storage unit 317, the handover map information generating unit 311c generates provisional handover map information, which provisionally sets a boundary where switching operation between the first wireless base station 41-1 and the second wireless base station 41-2 is to be executed, based on the data communication quality of the communication area of the first wireless base station, for example, the wireless base station 41-1 and the data communication quality of the communication area of the second wireless base station, for example, the wireless base station 41-2, and stores the provisional handover map information in the handover map information storage unit 319.

Referring to the no-handover zone information storage unit 320, the handover map information generating unit 311c may generate provisional handover map information, which provisionally sets the communication area of the first wireless base station 41-1 and the communication area of the second wireless base station 41-2, based on the data communication quality of the first wireless base station 41-1 and the data communication quality of the second wireless base station 41-2, and, if the boundary between the communication area 42-1 of the first wireless base station and the communication area 42-2 of the second wireless base station and the no-handover zone overlap each other, may correct the provisional handover map information so as to place the boundary outside the no-handover zone to generate corrected handover map information, and may store the corrected handover map information in the handover map information storage unit 319. Here, the handover map information generating unit 311c may perform the correction based on at least one of an index value indicating data communication quality in the no-handover zone, a result of a comparison between a distance from the travel-permitted region to the first wireless base station 41-1 and a distance from the travel-permitted region to the second wireless base station 41-2, and a result of a comparison between a size of the communication area 42-1 of the first wireless base station 41-1, the communication area 42-1 of the first wireless base station 41-1 occupying the travel-permitted region, and a size of the communication area 42-2 of the second wireless base station 41-2, the communication area 42-2 of the second wireless base station 41-2 occupying the travel-permitted region.

The server-side communication control unit 311d perform wireless data communication control processing with the on-board terminal equipment 26. Examples of data which are transmitted from the control server 31 to the on-board terminal equipment 26 include the corrected handover map information and the permission response information in this embodiment. When the on-board terminal equipment 26 performs switching operation of the connected wireless base station based on the corrected handover map information, switching operation of the connected base station can be performed outside the no-handover zone. Therefore, in this embodiment, the corrected handover map information corresponds to the switching operation control information, and the handover map information generating unit that generates the corrected handover map information corresponds to the switching operation control unit.

The input control unit 311e accepts operation which the user has performed on the server-side input device 312. The control server 31 may be configured such that, if the user executes operation to change the position of a boundary section between communication areas, which are displayed on the screen of the server-side display device 313, by using the server-side input device 312, for example, the input control unit 311e accepts the operation and the handover map information generating unit reflects the operation as an amount of correction to the handover map information.

The display control unit 311f performs the generation of an image, which is to be displayed on the server-side display device 313, and display control processing.

The on-board terminal equipment 26 will next be described with reference to FIG. 3B. The terminal-side control device 261 of the on-board terminal equipment 26 is provided with a terminal-side communication control unit 261a, a request information processing unit 261b, and an autonomous travel control unit 261c.

The terminal-side communication control unit 261a executes wireless data communication control processing with the control server 31. Examples of data which are transmitted from the on-board terminal equipment 26 to the control server 31 include the permission request information, which is for requesting a new (next) travel-permitted region, and the position information of the own vehicle. The terminal-side communication control unit 261a also executes control to receive various data wirelessly transmitted from the control server 31.

Based on at least one of the provisional handover map information, the corrected handover map information, the no-handover zone information, and the information for allowing the on-board terminal equipment to execute switching operation of the connected wireless base station based on the provisional handover map information (for example, the switching command information for switching operation), the terminal-side communication control unit 261a also executes switching operation in a zone outside the permission requesting zone in the travel-permitted zone, and does not execute a handover in a no-handover zone (the permission requesting zone, the inside of the loading site, the insides of the dumping sites).

Further, the terminal-side communication control unit 261a may acquire the position information of the own vehicle from the position calculating device 269 mounted on the dump truck 20, may determine, based on the information indicating the no-handover zone and the position information of the own vehicle, whether the position of the own vehicle is included in the no-handover zone, and, if the position of the own vehicle is not included in the no-handover zone and the current connected wireless base station is not the same as the wireless base station corresponding to the communication area including the position of the own vehicle in the provisional handover map information, may execute switching operation.

Upon receipt of the permission response information, the terminal-side communication control unit 261a outputs it to the autonomous travel control unit 261c.

The request information processing unit 261b generates, to the control server 31, permission request information for requesting the setting and giving of a new travel-permitted region. If no destination has been set when each dump truck 20 begins to travel, the request information processing unit 261b also generates destination request information to request the setting of a destination. Referring to the map information in the route map information storage unit 266 and the position information of the own vehicle from the position calculating device 269, the request information processing unit 261b determines whether the own vehicle has reached a permission requesting point.

With reference to the permission response information, the route map information indicating the travel route and stored in the route map information storage unit 266, and the position information of the own vehicle from the position calculating device 269, the autonomous travel control unit 261c performs travel control on the travel controller 267 so that the dump truck 20 travels along the travel route and does not travel beyond the travel-permitted region. Because the autonomous travel control unit 261c performs the travel control so that the dump truck 20 does not travel beyond the travel-permitted region, non-receipt of the permission response information causes the dump truck 20 to stop, hinders the operation of the mine, and lowers the productivity of the mine.

Referring to FIGS. 4A to 4C, a description will next be made about the configurations of the communication quality information, handover map information and no-handover zone information to be used in the wireless communication system 1. FIGS. 4A to 4C are tables showing the configurations of the communication quality information, handover map information and no-handover zone information, in which FIG. 4A shows a table configuration example of the communication quality information, FIG. 4B shows a table configuration example of the handover map information, and FIG. 4C shows a table configuration example of the no-handover zone information.

As shown in FIG. 4A, the communication quality information designated at reference sign 400 is configured as a table that tabulates measuring coordinates 401 and access point (AP, in other words, wireless base station) qualities 402. The measuring coordinates 401 represent desired positions in the mine field. On the other hand, the AP qualities 402 indicate quality information of data communications (hereinafter referred to as "data communication quality information") between the respective measuring coordinates 401 and all the APs arranged in the mine field. No particular limitation is imposed on the kind of the data communication quality information insofar as they are values indicating the qualities of data communications, for example, radio wave intensities or communication error rates.

As shown in FIG. 4B, the handover map information designated at reference sign 500 are configured of AP identification information 501 and handover zone definition information 502 associated with each other. The AP identification information 501 serves as information that specifically identifies the individual APs. The handover zone definition information 502 is position information of divided zones in the mine field, which are to be connected to the APs defined by the AP identification information 501. In other words, the handover zone definition information 502 is communication areas of the individual APs. When the dump truck 20 travels across adjacent communication areas, a handover is performed in a boundary section between the communication areas. Various forms can be contemplated as the form of the handover zone definition information 502. Illustrative are a set of vertex coordinates for defining line segments dividing an area, and a round area defined by information of the coordinates of a center point and a radius. The expression method of the handover zone definition information 502 is, therefore, not limited to the example in this embodiment.

As shown in FIG. 4C, the no-handover zone definition information designated at reference sign 601 defines areas, in which the performance of handover processing is prohibited in the mine field, by their position information. Concerning the manner of the definition of the zone information, they may be defined in various forms like the handover zone definition information 502.

Figure 5A:
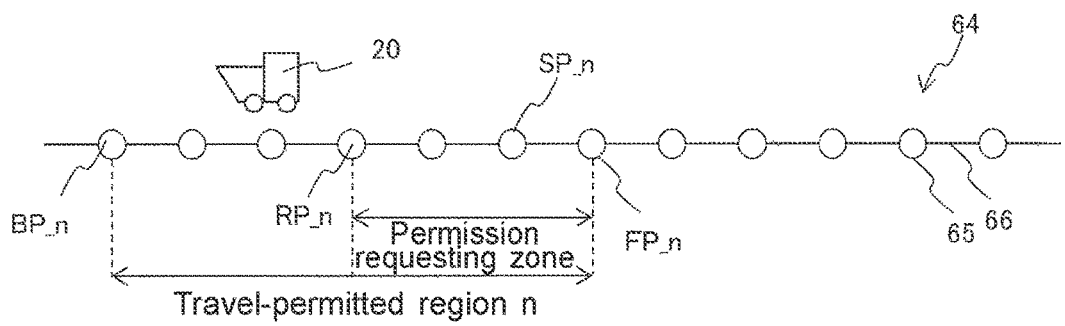
Figure 5B:
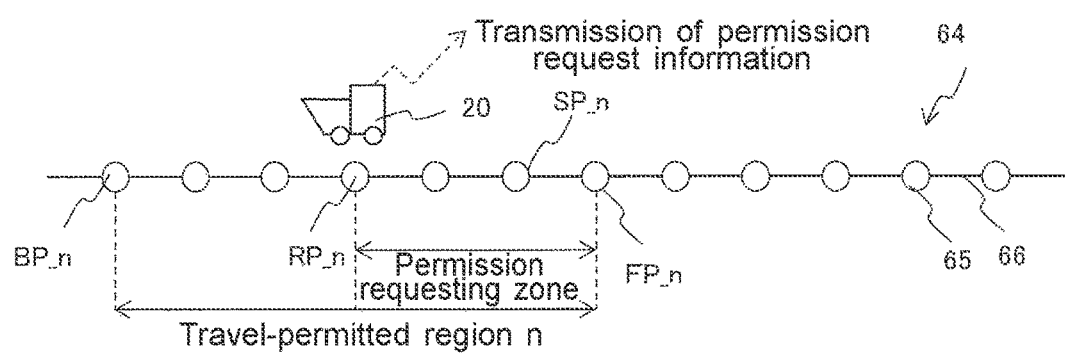
Figure 5C:
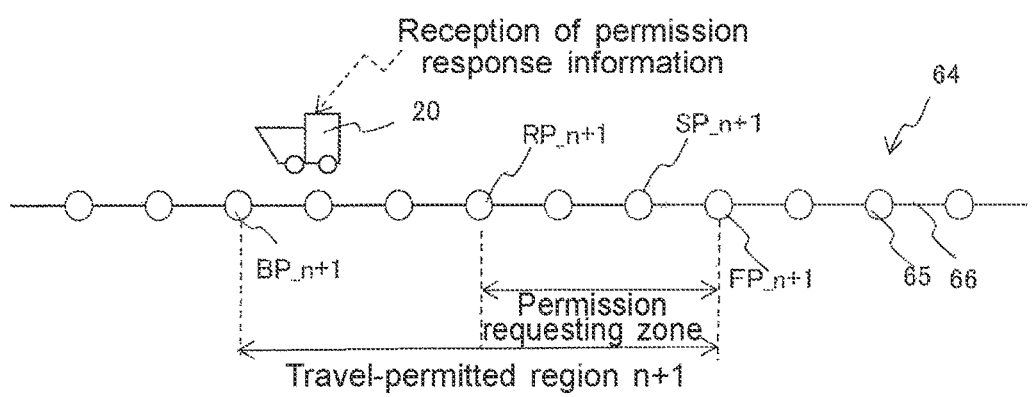

Referring next to FIGS. 5A to 5C, a description will be made about operation of the dump truck traveling according to travel-permitted regions. FIGS. 5A to 5C are diagrams illustrating operation of the dump truck traveling according to the travel-permitted regions, in which FIG. 5A illustrates a state of the dump truck traveling in a travel-permitted region n, FIG. 5B illustrates a state that the dump truck has reached a permission requesting point, and FIG. 5C illustrates the state of setting of a new travel-permitted region.

As illustrated in FIG. 5A, the travel route 64 is defined using nodes 65 and links 66. The travel-permitted region n includes seven nodes 65 and six links 66. These nodes and links are specified in the route map information.

A rear boundary point of the travel-permitted region n is indicated by BP_n, while its front boundary point is indicated by FP_n. A zone from a permission requesting point RP_n, which is a point where the dump truck 20 begins to transmit setting request information to the control server for a next new travel-permitted zone, to the front boundary point FP_n is called a "permission requesting zone". This embodiment is characterized in that the permission requesting zone is set as a no-handover zone, in which the on-board terminal equipment 26 is prohibited to perform a handover, and a handover is specified to be performed in a zone other than the permission requesting zone on the travel route.

The first node rearward of the front boundary point FP_n is a braking start point SP_n where braking operation is to be started. The dump truck 20 begins to transmit permission request information from the permission requesting point RP_n (see FIG. 5B), and, if the dump truck 20 cannot receive permission response information indicating a next new travel-permitted region from the control server 31 when the dump truck 20 has reached the braking start point SP_n, braking operation is started. Taking the front boundary point FP_n as a reference, the braking start point SP_n is set at a point that allows the dump truck 20 to stop before the front boundary point FP_n when braking operation is started there. Therefore, the dump truck 20 can stop before traveling beyond the front boundary point FP_n and can stop without traveling beyond the travel-permitted region n. Even if a preceding vehicle exists, the dump truck 20 can hence avoid an interference with the preceding vehicle.

Upon receipt of the permission request information, the control server 31 vacates the travel-permitted region n in rear of the dump truck 20. For the vacated region, a travel permission can be given to another dump truck. The control server 31 then sets a new travel-permitted region n+1. The new travel-permitted region n+1 has, as a front boundary point FP_n+1, a node at a greatest distance that can be set as a travel-permitted region (if there is a preceding vehicle, however, the frontmost end of a vacated region set in rear of the vehicle). In FIG. 5C, the travel-permitted region n+1 is a region from the front boundary point FP_n+1 to the rear boundary point BP_n+1, in which a permission request point RP_n+1 and a braking start point SP_n+1 are included.

If the above-described setting processing of a travel-permitted region is repeated, an interference between dump trucks themselves can be avoided because only one dump truck travels in each travel-permitted zone and no other dump truck enters the travel-permitted region.

When the travel-permitted region is updated, the permission requesting zone is also updated correspondingly. Following the update of the permission requesting zone, the no-handover zone is also updated. It is to be noted that this embodiment can be also applied when a travel-permitted region is set fixedly (statically) on the travel route 64.

Figure 6:
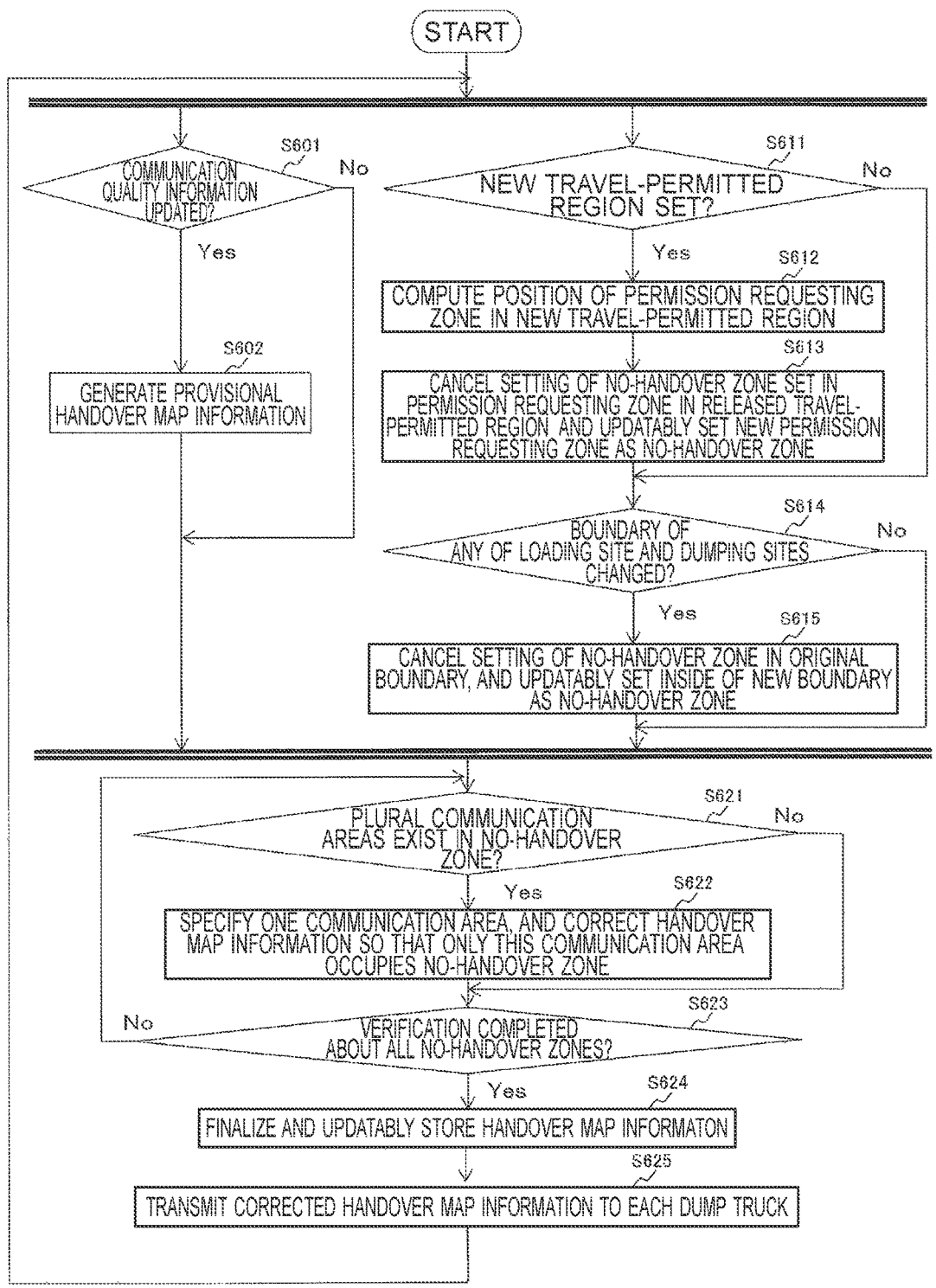
FIG. 6 is a flow chart illustrating a flow of handover map information generating processing in the first embodiment.

Referring next to FIG. 6, a description will be made about a flow of handover map information generating processing with no-handover zone information reflected thereto in this embodiment. FIG. 6 is a flow chart illustrating the flow of the handover map information generating processing in the first embodiment.

In the handover map information generating processing, described specifically, processing (S601 to S602) that generates provisional handover map information based on data communication quality information and setting processing (S611 to S614) of a no-handover zone are executed in parallel. Following these processing, processing (S621 to S625) that resets the boundaries of communication areas in the provisional handover map information by using no-handover zone information and finalizes the handover map information is executed. By repeating these processing, corrected handover map information is generated corresponding to changes in the status of data communication quality. A description will hereinafter be made about details of the handover map information generating processing.

In the mine field, due to changes in the positions of arrangement of wireless base stations and changes in terrain, events such as changes in radio wave intensity distribution and the occurrence of noises and interference radio waves arise, so that data communication quality changes. Corresponding to the changes in data communication quality, the communication quality information in the communication quality information storage unit 317 is updated (S601/Yes).

The handover map information generating unit 311c reads the communication quality information stored in the communication quality information storage unit 317, and based on the communication quality information, generates provisional handover map information (S602). The handover map information generating unit 311c may generate handover map information by connecting measuring coordinates 401, where an index value of data communication quality predetermined to lower the risk of interruptions of wireless communications by the AP qualities 402 in the communication quality table (see FIG. 4A) is satisfied, to set a boundary at which a handover is to be performed, and defining a closed zone. The handover map information generated as described above sets the same AP to be a candidate base station in the closed zone. Boundaries in the handover map indicate points where switching operation of the connected base station is to be performed, that is, handover points.

In addition to the mode that the handover map information generating unit 311c automatically generates handover map information, the user may operate the server-side input device 312 to manually generate the handover map information.

If the communication quality information has not been updated in step S601 (S610/No), the processing advances to step S621.

If the travel-permitted region setting unit 311a receives permission request information from the dump truck 20 and sets a new travel-permitted region (S611/Yes), the travel-permitted region setting unit 311a computes the position of a permission requesting zone in the new travel-permitted region (S612), and stores it as zone information in the region information storage unit 318.

The no-handover zone setting unit 311b cancels the setting of the no-handover zone set in the permission requesting zone in the vacated travel-permitted region n, and updatably sets a new permission requesting zone n+1 as a no-handover zone (S613).

If a mobile survey vehicle travels along edges of the loading site and dumping sites, position information of a region where the dump truck 20 is permitted to travel is transmitted to the control server 31, and, if there is a change to the map information stored in the route map information storage unit 316 (S614/Yes), the no-handover zone setting unit 311b cancels the setting of the no-handover zone in the original boundary, and updatably sets the inside of a new boundary as a no-handover zone (S615).

If no new travel-permitted region has been set (S611/No), the processing advances to step S614. If no change has been made to the boundary of any of the loading site and dumping sites (S614/No), the processing advances to step S621.

Referring to the no-handover zone information, the handover map information generating unit 311c determines if the communication areas of plural APs are included in each no-handover zone, in other words, if each no-handover zone and the boundary between different communication areas overlap.

If affirmative (S621/Yes), one of the plural communication areas included in the no-handover zones is specified, and the provisional handover map information is changed so as to make only the specified communication areas occupy the no-handover zone, whereby a corrected handover map is generated (S622). As a guideline for selecting the one communication area at this time, there is a method such as, for example, selecting a communication area of the largest area, selecting a communication area shortest in distance to the associated AP, or selecting a communication area of better data communication quality. If negative in step S621 (S621/No), the processing advances to step S623.

If the handover map information generating unit 311c has not completed verification about all the no-handover zones (S623/No), the processing returns to step S621. If has completed verification (S623/Yes), the handover map information generating unit 311c updatably stores the handover map information in the handover map information storage unit 319 (S624).

The server-side communication control unit 311d transmits the corrected handover map information from the server-side communication device 314 to each dump truck 20 (S625). The dump truck 20 which has received the corrected handover map information updates the handover information in the handover map information storage unit 270 of the on-board terminal equipment 26. As a consequence, synchronization is realized in handover map information between the control server 31 and the on-board terminal equipment 26, so that a candidate base station for the dump truck 20 is selected according to the latest handover map information.

Figure 7:
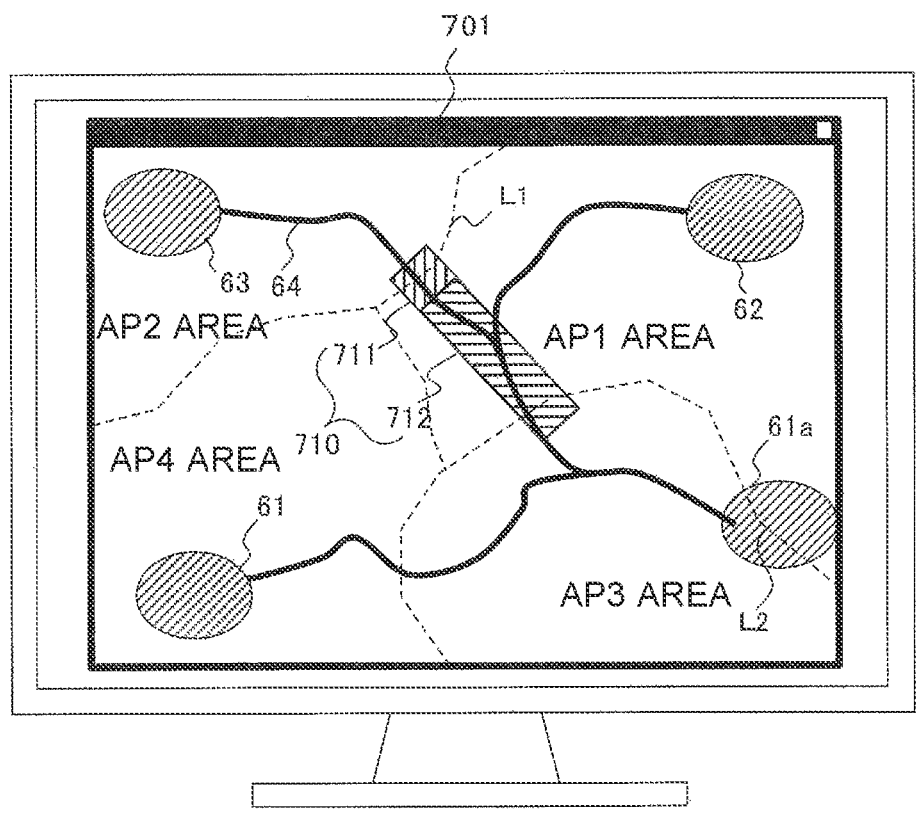
FIG. 7 is a view illustrating an illustrative display screen showing a state that a boundary between communication areas and a no-handover zone overlap each other.
Figure 8:
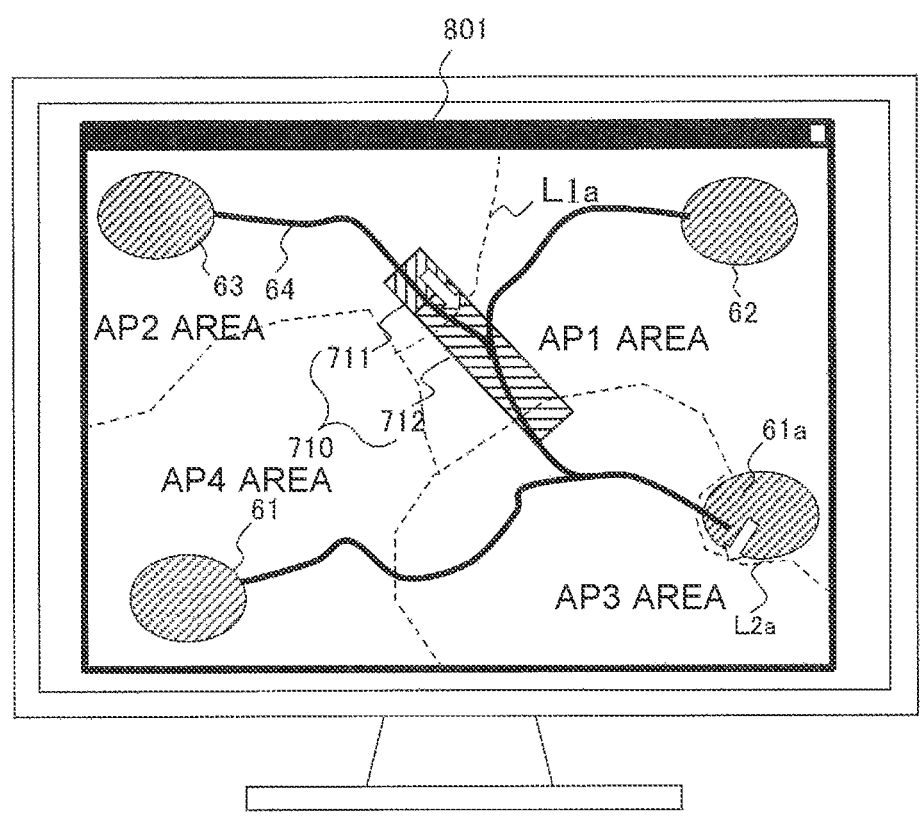
FIG. 8 is a view illustrating another illustrative display screen showing a state that the boundary between the communication areas in FIG. 7 has been changed to outside the no-handover zone.

With reference to FIGS. 7 and 8, a description will next be made about examples of display output of the handover map information. These examples of display output may be displayed, for example, by the display control unit 311f on the screen of the server-side display device 313 of the control server 31. FIG. 7 is a view illustrating an illustrative display screen showing a state that a boundary between communication areas and a no-handover zone overlap each other. FIG. 8 is a view illustrating another illustrative display screen showing a state that the boundary between the communication areas in FIG. 7 has been changed to outside the no-handover zone.

In a screen 701 of FIG. 7, the travel route 64 is divided into four communication areas, specifically AP1 area, AP2 area, AP3 area and AP4 area. From the AP3 area toward the AP2 area, a travel-permitted region 710 has been set. In the travel-permitted region 710, a zone including a front boundary point is a permission requesting zone 711, while a rear zone 712 including a rear boundary point is a zone in which a handover is allowed. The boundary between the AP1 area and the AP3 area is included in the rear zone 712, but the position of this boundary does not need any change. On the other hand, the boundary between the AP1 area and the AP2 area is included in the permission requesting zone 711, and the position of this boundary needs a change.

Via the travel route 64, the loading site 61 and the dumping sites 62,63 are connected together. The insides of these loading site 61 and dumping sites 62,63 are also set as no-handover zones. Each no-handover zone can take any shape insofar as it is a closed zone, and therefore no limitation is imposed on the kind of its shape. Illustrative are polygonal shapes, elliptical shapes, and the like.

As illustrated in FIG. 8, the handover map information generating unit 311c changes a boundary L1, which crosses the permission requesting zone 711, to the side of the rear zone 712 of the permission requesting zone 711 (changed from the boundary L1 to a boundary L1a). In addition, the handover map information generating unit 311c changes a boundary L2 in a loading site 61a to the outside of the loading site 61a (changed from the boundary L2 to a boundary L2a).

Figure 9:
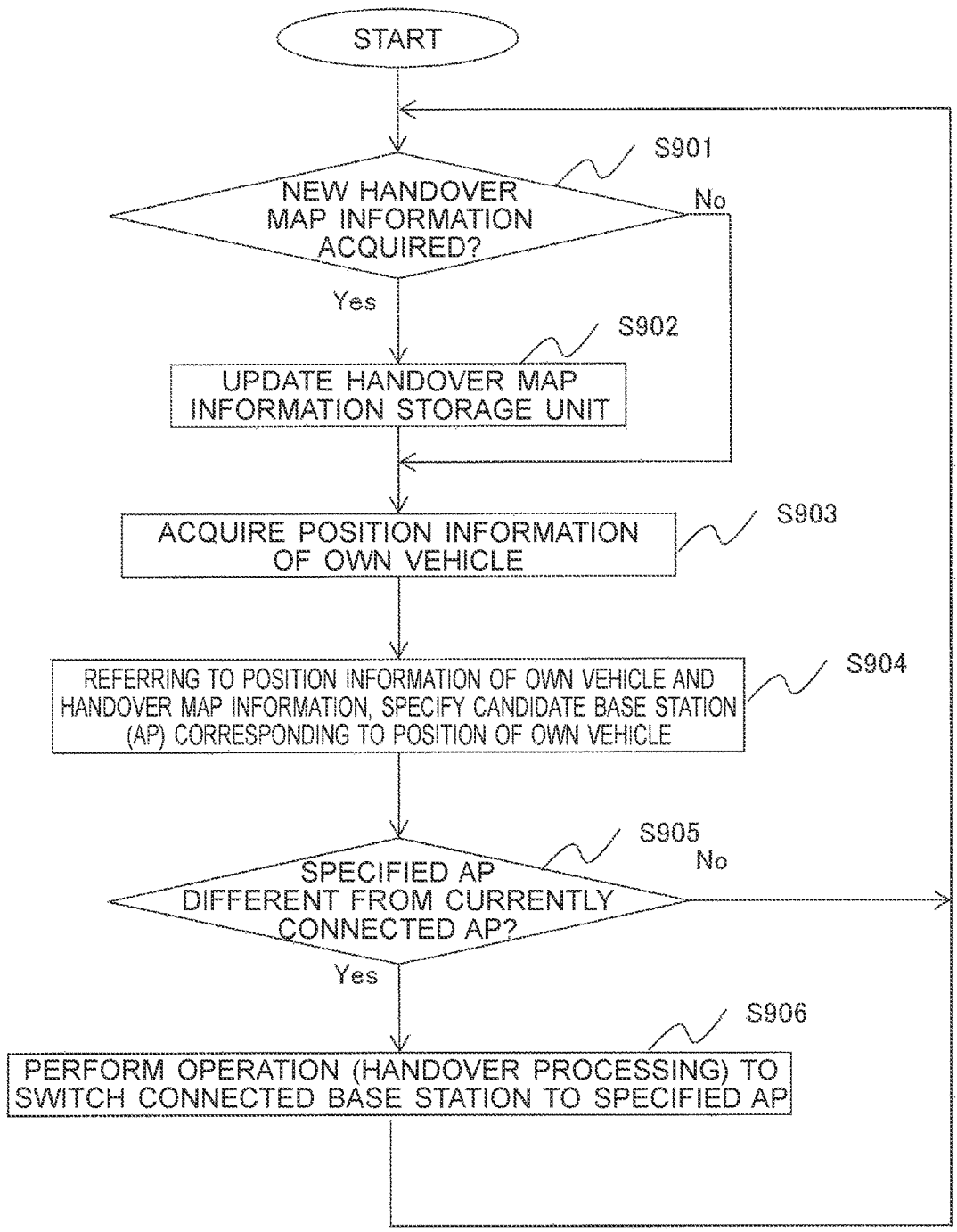
FIG. 9 is a flow chart illustrating a flow of processing of operation relating to a handover by a terminal-side communication control unit of the dump truck.

Referring next to FIG. 9, a description will be made about operation relating to a handover at the terminal-side communication control unit 261a of the dump truck 20. It is assumed that upon starting the processing of FIG. 9, the latest handover map information has been stored in the handover map information storage unit 270 before the dump truck 20 begins to travel.

If new handover map information is acquired from the control server 31 (S901/Yes) after the dump truck 20 has begun to start, the new handover map information so acquired is overwritten in the handover map information storage unit 270 (S902). Subsequently, the handover map information acquired here will be referred to until new handover map information is acquired next. If the dump truck 20 has not acquired any new handover map information (S901/No), the handover map information stored in the handover map information storage unit 270 of the on-board terminal equipment 26 will be used as a reference object.

During traveling, the terminal-side communication control unit 261a acquires position information of the own vehicle from the position calculating device 269 before the permission requesting zone (S903). The term "permission requesting zone" as used herein means a zone in which setting request information for a new travel-permitted region is transmitted while the dump truck 20 is traveling on the travel route 64, and, if the dump truck 20 wishes to enter the loading site or one of the dumping sites, means a zone in which the dump truck 20 transmits information that requests an approach route (dynamic path) to a stop spot (loading point or dumping point) set inside the loading site or the one of the dumping sites.

The terminal-side communication control unit 261*a* then compares the handover map information, which is stored in the handover map information storage unit 270, with the position information of the own vehicle, and for connection to the wireless communication network 40, specifies a candidate base station (S904).

If the candidate base station specified in step S904 is different from the currently-set connected base station (S905/Yes), the terminal-side communication control unit 261*a* performs switching operation (a handover) to the wireless base station specified in step S903 (S906). Subsequently, the dump truck 20 continues traveling, and upon reach to a permission requesting point, transmits permission request information to the control server 31. The request information processing unit 261*b* determines, with reference to the position of the own vehicle and the contents of the permission request information, which one of a travel-permitted region and an approach route should be requested, and generates permission request information corresponding to a result of the determination.

If the candidate base station specified in step S904 is the same as the currently-set connected base station (S905/No), the dump truck 20 does not perform any handover, and continues traveling. Subsequently, the dump truck 20 repeats the processing of from step S901 to step S906 during traveling.

According to this embodiment, a handover is performed before the permission requesting zone, the loading site or one of the dumping sites, and no handover is performed in the permission requesting zone, the loading site or the one of the dumping sites. As a consequence, it is possible to avoid frequent handovers between the dump truck and the control server and also at points where the transmission and reception of information indispensable for the operation of the truck is performed. As a result, it is possible to avoid an interruption of wireless communication, which would otherwise occur due to a handover failure, and hence to deter the dump truck from stopping. Further, this embodiment does not require any GPS signals for determining no-handover zone, in other words, zones in which a handover can be performed so that, even under a mine environment that is prone to the occurrence of GPS electromagnetic interference, zones in which a handover is performed can be determined without being affected by such a mine environment. In addition, the insides of the loading site and dumping sites are set as no-handover zones with no exception, so that positional changes of the approach routes do not affect handover operations.

Second Embodiment

Figure 10A:
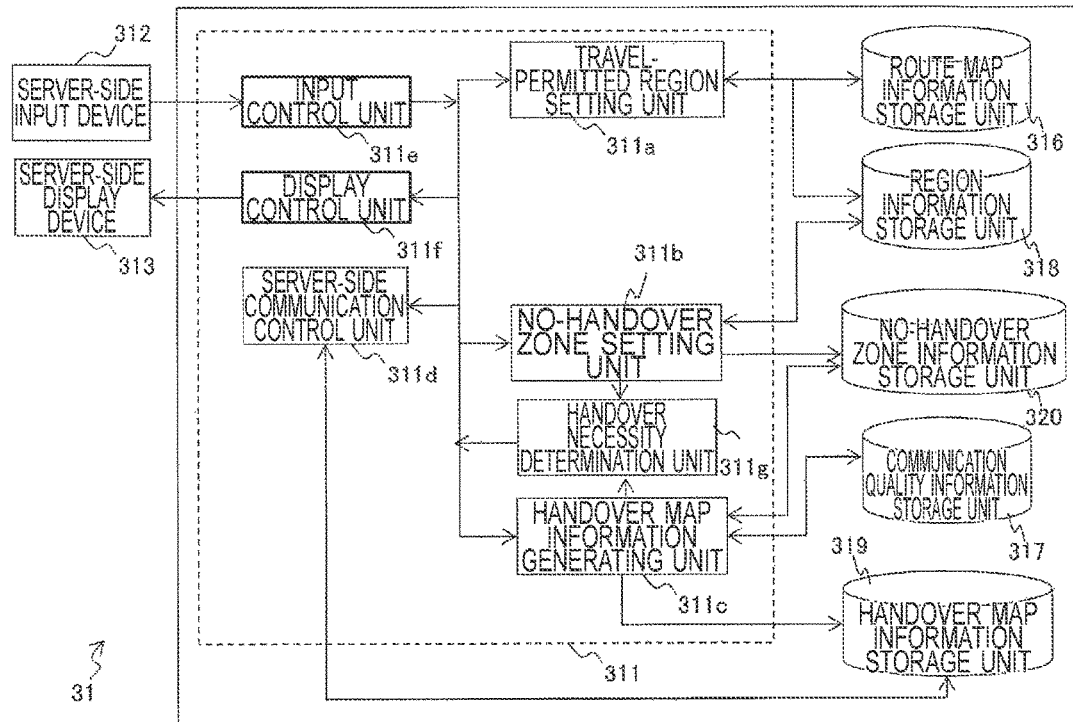
Figure 10B:
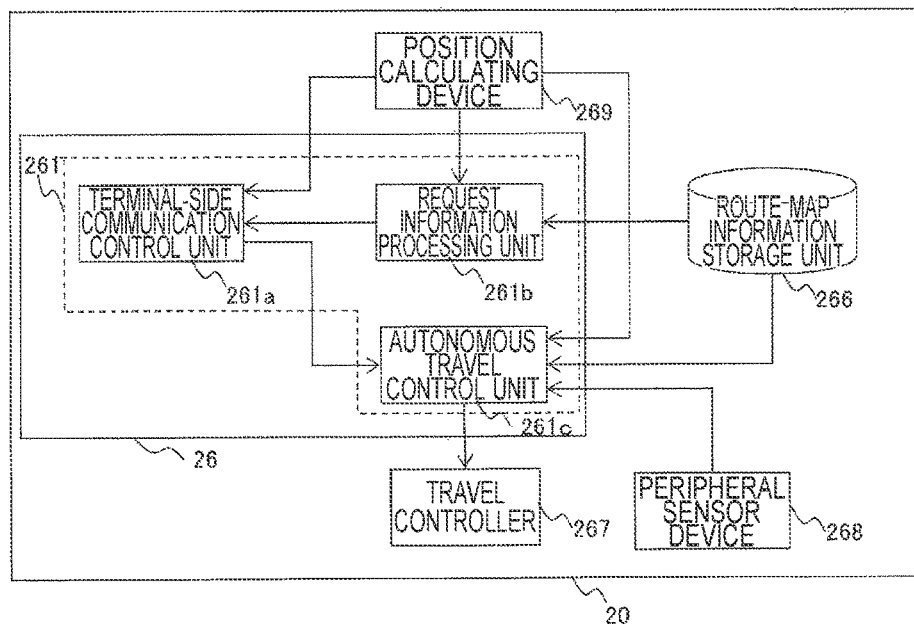
Figure 11:
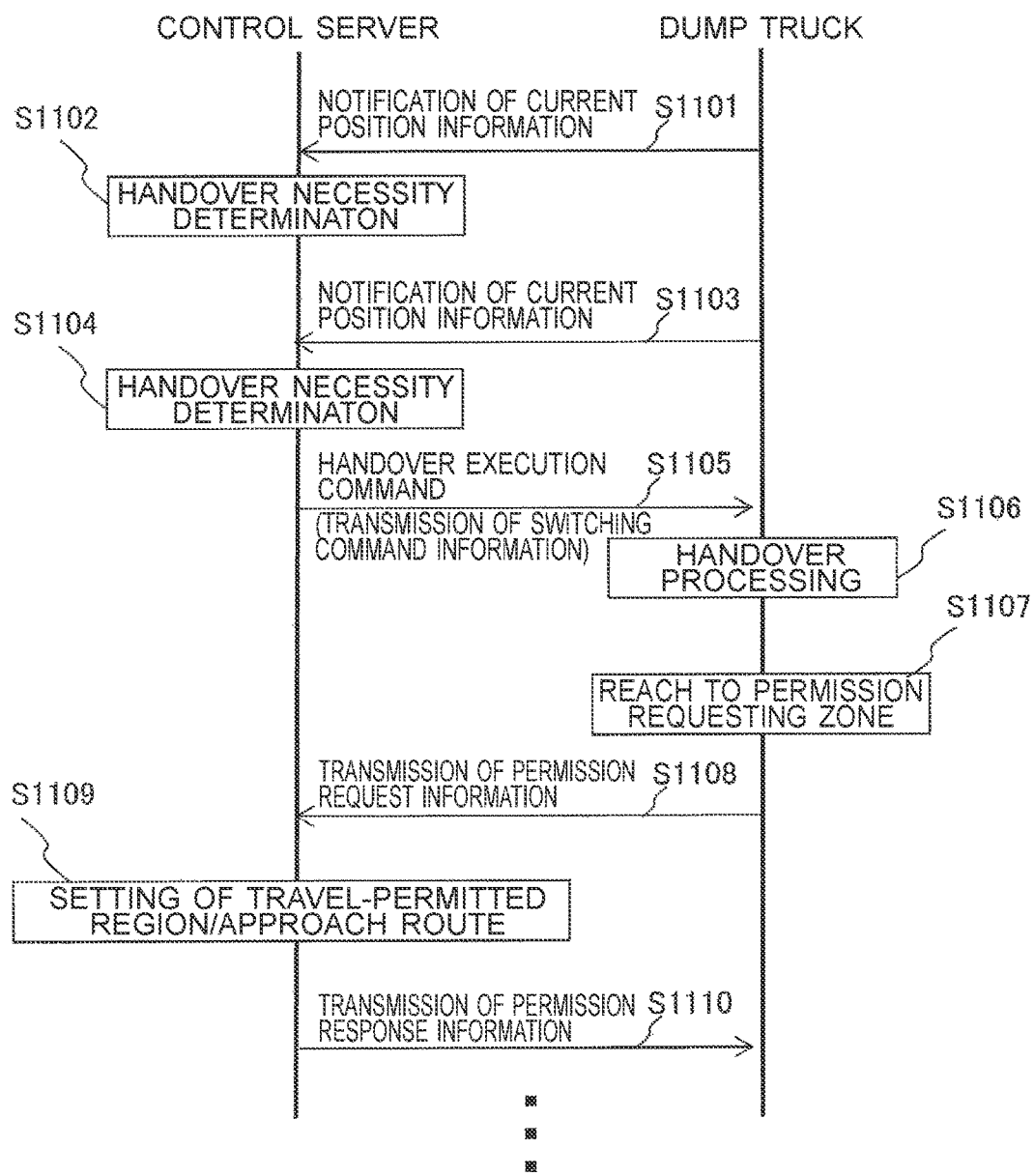
FIG. 11 is a sequence diagram showing a flow of processing at the control server and on-board terminal equipment in the second embodiment.

According to the second embodiment, a control server generates handover map information, receives from each dump truck periodically-transmitted position information of the own vehicle, and performs on the side of the control server a determination as to whether the performance of a handover by the dump truck is needed; and, if the performance of the handover is determined to be needed, the control server outputs an execution command for handover processing (switching command information) to the side of the dump truck, and upon receipt of the execution command for handover processing, the handover processing is performed on the side of the dump truck. Referring to FIGS. 10A, 10B and 11, a description will hereinafter be made about the second embodiment.

FIGS. 10A and 10B are functional block diagrams illustrating principal functions of a control server and an on-board terminal equipment in a second embodiment, in which FIG. 10A illustrates the configuration of the control server, and FIG. 10B illustrates the configuration of the on-board terminal equipment. FIG. 11 is a sequence diagram showing a flow of processing at the control server and on-board terminal equipment in the second embodiment.

As illustrated in FIG. 10A, the control server designated at reference sign 31 in the second embodiment also includes a handover necessity determination unit 311*g* in addition to the configuration of the control server 31 in the first embodiment. On the other hand, the on-board terminal equipment designated at reference sign 26 is different in that the handover map information storage unit 270 is not included.

If the wireless base station corresponding to the communication area including the position of the own vehicle in the corrected handover map information and the wireless base station indicated by the base station identification information are not the same, the handover necessity determination unit 311*g* determines a need for switching operation of the connected wireless base station, and generates and transmits switching command information for switching operation to the on-board terminal equipment. If the on-board terminal equipment performs switching operation of the connected wireless base station according to the switching command information, the switching operation of the connected base station can be performed outside a no-handover zone. Therefore, in this embodiment, the switching command information corresponds to the switching operation control information, and the handover map information generating unit and handover necessity determination unit, which are needed to generate the switching command information, correspond to the switching operation control unit.

Referring next to FIG. 11, a description will be made of a communication flow between the control server and the dump truck, and a processing flow. It is assumed that upon performing the processing of FIG. 11, handover map information for the mine has already been prepared by the procedures shown in FIG. 12.

The dump truck 20 transmits, to the control server 31, the position information of the own vehicle, which the position calculating device 269 periodically outputs (S1101, S1103).

Based on the position information of the own vehicle of the dump truck 20 as received, the control server 31 performs a handover necessity determination (S1102, S1104). This handover necessity determination processing is the same processing as in the steps S904 and S905 in the first embodiment. If a handover is determined to be needed as a result of the handover necessity determination, the control server 31 transmits an execution command for the handover (switching command information) to the dump truck (S1105). Upon receipt of the switching command information, the dump truck 20 performs handover processing in accordance with the switching command information (S1106). Here, it is assumed that upon transmission of the switching command information and execution of handover processing, the dump truck 20 exists outside a no-handover zone (permission requesting zone), because the boundary between communication areas is set to be located outside the no-handover zone.

Subsequently, the dump truck 20 reaches the permission requesting zone (S1107), and transmits permission request information (S1108). Responsive to the permission request information, the control server 31 sets a new travel-permitted region or approach route (S1109), and returns permission response information, which indicates the contents of the new travel-permitted region or approach route to the dump truck 20 (S1110).

By repeating the processing described above, it is possible to perform the generation of handover map information and to make the determination of handover necessity on the side of the control server.

Third Embodiment

Figure 12:
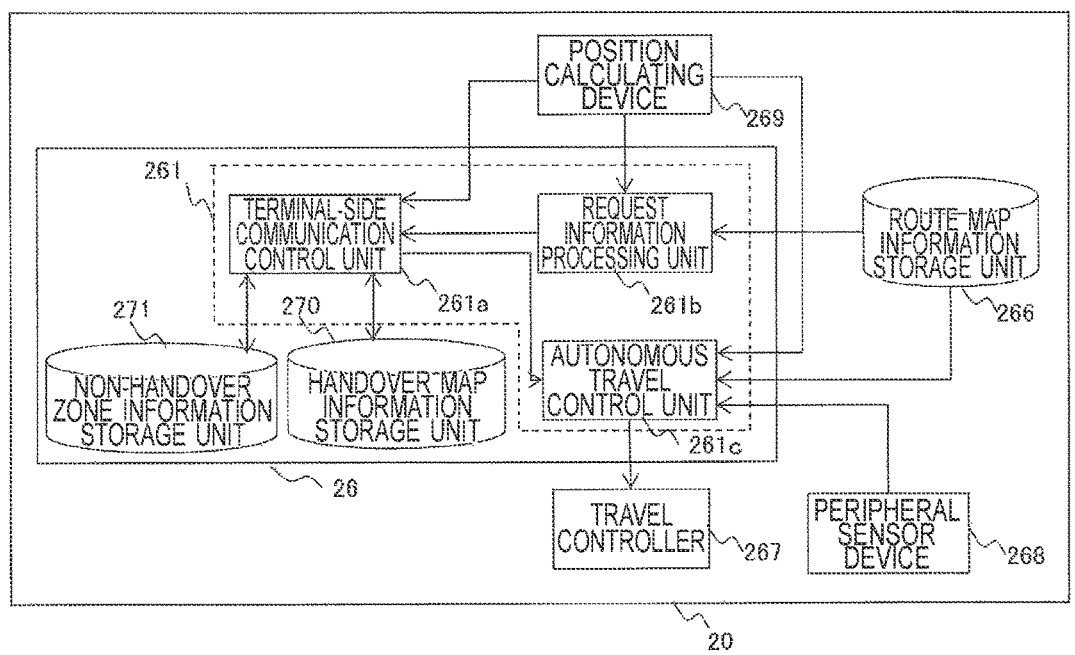
FIG. 12 is a functional block diagram illustrating principal functions of an on-board terminal equipment in a third embodiment.

According to the third embodiment, handover map information and no-handover zone information are transmitted to an on-board terminal equipment of a dump truck, and, if the position of the own vehicle is outside the no-handover zone, the connected wireless base station is determined with reference to the handover map information or is switched if needed. Therefore, in this embodiment, the handover map information and no-handover zone information correspond to the switching operation control information, and the handover map information generating unit for generating the handover map information corresponds to the switching operation control unit. Referring to FIGS. 12 and 13, a description will hereinafter be made about the third embodiment. FIG. 12 is a functional block diagram illustrating principal functions of the control server and on-board terminal equipment in a third embodiment. FIG. 13 is a flowchart illustrating a flow of processing at the on-board terminal equipment in the third embodiment.

As illustrated in FIG. 12, the on-board terminal equipment 26 in the third embodiment is different from the on-board terminal equipment 26 in the first embodiment in that a no-handover zone information storage unit 271 is included.

Referring next to FIG. 13, a description will be made about the flow of processing (processing relating to a handover) at the on-board terminal equipment in this embodiment. It is assumed that upon starting the processing of FIG. 13, the handover map information storage unit 270 and no-handover zone information storage unit 271 have already been updated. As a premise in this embodiment, it is assumed that the travel-permitted region for the dump truck, at any position, falls in the communication area of one of the APs and the communication areas of the adjacent APs overlap each other. Owing to this premise, it is assumed that, even in any zone where no handover is feasible, the dump truck belongs to the communication area of one of APs and wireless communications are not interrupted.

If new no-handover zone information has been acquired from the control server 31 after the dump truck 20 began to travel (S1301/Yes), the acquired new no-handover zone information is overwritten in the no-handover zone information storage unit 271 (S1302). Subsequently, the no-handover zone information acquired at this time will be referred to until new no-handover zone information is acquired next. If the dump truck 20 has not received any new no-handover zone information (S1301/No), the no-handover zone information stored in the no-handover zone information storage unit 271 of the on-board terminal equipment 26 will be used as a reference object.

The terminal-side communication control unit 261*a* acquires the position information of the own vehicle from the position calculating device 269 (S1303). The terminal-side communication control unit 261*a* then compares the no-handover zone information, which is stored in the no-handover zone information storage unit 271, with the position information of the own vehicle. If the position of the own vehicle is not inside the no-handover zone (S1304/Yes), the processing of from step S904 to step S906 in the first embodiment is executed. If the position of the own vehicle is inside the no-handover zone (S1304/No), the processing return to step S1301 without performing handover processing.

By repeating the above-described processing, traveling can be continued without performing any handover in the no-handover zone.

The above-described embodiments do not limit the present invention, and various changes and modifications can be made within a scope not departing from the spirit of the present invention. For example, the above-description was made taking, as an example, the on-board terminal equipment mounted on the autonomous travel vehicle, but the present invention may also be applied to the selection of a wireless base station by an on-board terminal equipment mounted on a manned vehicle that travels according to operation by an operator. Further, when the control sever sets a next new travel-permitted region, the position of a permission requesting zone may be calculated based on the distance from a front boundary point, and a determination may be made as to whether the boundary between communication areas is included in the permission-requesting zone. If the boundary is included, a command may be generated to execute a handover in a rear zone other than the permission requesting zone in the new travel-permitted region, and the command may be added to permission response information for responding the new travel-permitted region. As a consequence, by setting the travel-permitted region and also transmitting a command from the control server to the on-board terminal equipment to perform processing of a handover outside the permission requesting zone, it is possible to avoid a handover in the permission requesting zone.

LEGENDS

1 wireless communication system
10,10-1,10-2 excavator
20,20-1,20-2 dump truck
31 control server
40 wireless communication network
41-1,41-2,41-3 wireless base station
60 haul route

The invention claimed is:

1. A wireless communication system including an on-board terminal equipment mounted on a working machine, which travels along a predetermined travel route in a mine, and a control server, which manages operation of the working machine, communicably connected together via a network including a first wireless base station and a second wireless base station, wherein:
   the control server comprises:
   a travel-permitted region setting unit that for the working machine, sets a region in the travel route, for which a travel permission has been given only to the working machine, as a travel-permitted region and generates permission response information including position information of the travel-permitted region,
   a no-handover zone setting unit that sets a travel permission requesting zone in the travel-permitted region, in which zone, the working machine makes a setting request to the control server for setting a new travel-permitted zone as a no-handover zone in which switching of a connected base station from the first wireless base station to the second wireless base station is prohibited, a switching operation control unit that generates switching operation control information for allowing the working machine to perform switching of the connected base station outside the no-handover zone, and a server-side communication control unit that transmits the switching operation control information to the working machine; and the on-board terminal equipment comprises:

a terminal-side communication control unit that receives the switching operation control information, and based on the switching operation control information, switches the connected wireless base station in a zone other than the no-handover zone, and transmits, to the control server, permission request information for making a setting request for the new travel-permitted zone.

2. The wireless communication system according to claim 1, wherein:

the control server includes, as the switching operation control unit, a handover map information generating unit that generates provisional handover map information, which provisionally sets a communication area of the first wireless base station and a communication area of the second wireless base station, based on data communication quality of a communication area of the first wireless base station and data communication quality of a communication area of the second wireless base station and, if a boundary between the communication area of the first wireless base station and the communication area of the second wireless base station and the no-handover zone overlap each other, corrects the provisional handover map information so as to place the boundary outside the no-handover zone, and generates corrected handover map information, the server-side communication control unit transmits the corrected handover map information as the switching operation control information to the on-board terminal equipment, and the terminal-side communication control unit receives the corrected handover map information, acquires, from a position calculating device mounted on the working machine, position information of an own vehicle during operation of the working machine, and, if the wireless base station having the communication area corresponding to the position of the own vehicle in the corrected handover map information and the wireless base station set as the connected base station by the terminal-side communication control unit are different, switches the connected wireless base station to the wireless base station corresponding to the position of the own vehicle.

3. The wireless communication system according to claim 2, wherein:

the handover map information generating unit performs the correction based on at least one of an index value indicating data communication quality in the no-handover zone, a result of a comparison between a distance from the travel-permitted zone to the first wireless base station and a distance from the travel-permitted zone to the second wireless base station, and a result of a comparison between a size of the communication area of the first wireless base station, the communication area of the first wireless base station occupying the travel-permitted zone, and a size of the communication area of the second wireless base station, the communication area of the second wireless base station occupying the travel-permitted zone.

4. The wireless communication system according to claim 1, wherein:

the control server includes, as the switching operation control unit, a handover map information generating unit and a handover necessity determination unit for determining necessity of switching of the connected wireless base station in the on-board terminal equipment, the handover map information generating unit generating provisional handover map information, which provisionally sets a communication area of the first wireless base station and a communication area of the second wireless base station, based on data communication quality of the communication area of the first wireless base station and data communication quality of the communication area of the second wireless base station and, if a boundary between the communication area of the first wireless base station and the communication area of the second wireless base station and the no-handover zone overlap each other, correcting the provisional handover map information so as to place the boundary outside the no-handover zone, and generating corrected handover map information, the terminal-side communication control unit acquires position information of an own vehicle from a position calculating device mounted on the working machine, and transmits, to the control server, the position information of the own vehicle and base station identification information that specifically indicates the wireless base station currently set as the connected base station, the handover necessity determination unit, if the wireless base station corresponding to the communication area, which includes the position of the own vehicle, in the corrected handover map information and the wireless base station indicated by the base station identification information are not the same, determines that switching of the connected wireless base station is needed, and generates switching command information for allowing the on-board terminal equipment to switch the connected wireless base station, the server-side communication control unit transmits the switching command information as the switching operation control information, and the terminal-side communication control unit switches the connected wireless base station according to the switching command information.

5. The wireless communication system according to claim 1, wherein:

the control server includes, as the switching operation control unit, a handover map information generating unit that generates handover map information, which sets a communication area of the first wireless base station and a communication area of the second wireless base station, based on data communication quality of the communication area of the first wireless base station and data communication quality of the communication area of the second wireless base station, the server-side communication control unit transmits the handover map information and no-handover zone information, which indicates the no-handover zone, as the switching operation control information to the on-board terminal equipment, and the terminal-side communication control unit acquires, from a position calculating device mounted on the working machine, position information of an own vehicle, compares the no-handover zone information and the position information of the own vehicle with each other, and, if the position of the own vehicle is not included in the no-handover zone and the current connected wireless base station is not the same as the wireless base station corresponding to the communication area that includes the position of the own vehicle in the handover map information, switches the connected wireless base station.

6. The wireless communication system according to claim 1, wherein:
the travel route is connected to at least one of a loading site, where a payload is loaded on the working machine, and a dumping site where the working machine dumps the payload, and
the no-handover zone setting unit further sets, as the no-handover zone, an inside of the loading site and an inside of the dumping site.

7. The wireless communication system according to claim 1, wherein:
the no-handover zone is defined as a closed zone in the mine.

8. A control server communicably connected to an on-board terminal equipment mounted on a working machine, which travels along a predetermined travel route in a mine, via a network including a first wireless base station and a second wireless base station, whereby the control server manages operation of the working machine, which comprises:
a travel-permitted zone setting unit that for the working machine, sets a region in the travel route, for which a travel permission has been given only to the working machine, as a travel-permitted zone and generates permission response information including position information of the travel-permitted zone,
a no-handover zone setting unit that sets a travel permission requesting zone in the travel-permitted region, in which zone, the working machine makes a setting request to the control server for setting a new travel-permitted zone as a no-handover zone in which switching of a connected base station from the first wireless base station to the second wireless base station is prohibited,
a switching operation control unit that generates switching operation control information for allowing the working machine to perform switching of the connected base station outside the no-handover zone, and
a server-side communication control unit that transmits the switching operation control information to the working machine.

9. A base-station switching operation control method for controlling switching operation of a base station in an on-board terminal equipment mounted on a working machine, which travels along a predetermined travel route in a mine, in a wireless communication system including the on-board terminal equipment and a control server, which manages operation of the working machine, communicably connected together via a network including a first wireless base station and a second wireless base station, which comprises the following steps:
setting, for the working machine, a zone in the travel route, for which a travel permission has been given only to the working machine, as a travel-permitted zone,
setting, as a no-handover zone in the travel-permitted zone, in which switching of a connected base station from the first wireless base station to the second wireless base station is prohibited, a permission requesting zone, in which the working machine makes a setting request to the control server for a new travel-permitted zone,
generating switching operation control information for allowing the working machine to perform switching of the connected base station outside the no-handover zone,
transmitting the switching operation control information to the working machine, and
allowing the working machine to switch the connected wireless base station according to the switching operation control information.

* * * * *